Patented Dec. 17, 1935

2,024,356

UNITED STATES PATENT OFFICE 2,024,356

CONFECTION AND METHOD OF PRODUCING SAME

Benjamin R. Harris, Chicago, Ill.

No Drawing. Application February 24, 1934, Serial No. 712,802

18 Claims. (Cl. 99—16)

My invention relates to candy confections. It relates more in particular to enrobing mixtures, icings, and other types of candy confections which will be identified more in detail as the description progresses.

For an understanding of the objects of the invention, chocolate enrobing compositions may be considered. When a chocolate mixture is made for enrobing candies and other confections, it is advisable that the chocolate mixture should be of a low viscosity, especially at a lower temperature. The main ingredients of chocolate mixtures of the class under consideration are powdered sugar, milk powder, cocoa powder, cocoa butter, or, in place of cocoa butter, hydrogenated coconut oil, palm kernel oil, pressed coconut stearine, or palm kernel stearine, or mixtures of such fats. In a normal, desirable mixture of ingredients of this character, the viscosity is ordinarily too high, unless a suitable ingredient is employed to lower the viscosity.

Similarly in the manufacture of icings where powdered sugar and fat are employed, low viscosities are demanded at relatively low temperatures at which the icing is applied. So also in the manufacture of toffees, caramels, fudges and fillings, where the fatty ingredients may be heated at a high temperature with pulverulent solids, such as sugar, in the presence of relatively small amounts of moisture, it is also necessary to have an emulsifying agent to make the emulsion stable at the high temperatures. In the preparation of cooked toffee, the pulverulent ingredients and fat are heated together to a temperature of about 285° F. to reduce the moisture content of the syrup. Here also improved results are obtainable by the addition of a suitable ingredient which will not only reduce the viscosity but will also function as an emulsifying agent at the relatively high temperatures employed.

The principal object of the present invention is to improve confections of the general character described.

Another object is the provision of a new ingredient for use in confections of the general character described.

Another object is to reduce the viscosity of confections of the general character identified by the incorporation therewith of relatively small amounts of an improved addition substance.

A further object is the utilization of an improved emulsifying agent in toffees and the like, which are heated to a relatively high temperature.

Other objects and features of the invention will be apparent as the detailed description thereof progresses.

A common characteristic of compositions of the character referred to is that a substantially pulverulent ingredient, such as sugar, cocoa butter and/or dried milk powder, is dispersed in a fat which contains substantially no moisture, or, as in the case of toffee and similar compounds, the dry pulverulent ingredients are dispersed in a fat in the presence of a small amount of moisture at higher temperatures. In the case of the substantially dry ingredients which may contain only very small proportions of moisture, such as one-half of one percent or more, or that present in the raw pulverulent material, a larger proportion of fat is required in the mixture in order to lower the viscosity. In these compositions, particularly chocolate and chocolate coating mixtures, other things being equal, the moisture content governs the viscosity within certain limits; that is to say, the higher the moisture content, the greater the viscosity.

I have discovered that by adding certain materials the characteristics of which will be described later, I can lower the viscosity of confections of the character described without increasing the fat concentration, and obtain a product which is fluid at working temperatures, such as enrobing temperatures, and which will remain fluid for a sufficient length of time to allow the product to go through the various steps of the process required to dip candy or ice cream, or cookies, or other confections, or to produce good icings and fillings. In the case of the compositions of matter which contain pulverulent materials dispersed in a fat in the presence of a small amount of moisture such as the preparation of toffees, the improved agents of my invention function also as emulsifying agents to enhance emulsification and to stabilize the emulsion at high temperatures.

That those skilled in the art may understand more fully the classes of materials to which my invention relates, I wish to say that generally speaking I am interested in improving compositions of matter which contain pulverulent ingredients such as powered sugar, powdered cocoa and/or powdered milk in combination with a fat, such as cocoa butter or other fat used in conjunction with or in place of cocoa butter. In this class of compositions, the moisture may be very low and of an adventitious character, as in the case, for example, of the ordinary chocolate coating, or it may be present in somewhat greater proportions, as in the case, for example, of toffees. The kind of products in which advantages are obtained by the use of my invention are chocolate and chocolate-like coatings for candy, cookies, ice cream and the like, caramels, icings, fillings, fudges, butter creams, and other compositions of this class which contain among other constituents at least one pulverulent ingredient incorporated in a fatty ingredient.

In accomplishing the objects of the present invention, I have discovered that if I add certain hydrophillic lipins containing free hydroxy groups to the coating, icing, toffee, or other similar confection, the viscosity will be reduced and, in the case of confections like toffees, emulsification at elevated temperatures is enhanced. In the case of chocolate coatings, for example, viscosity is reduced to such an extent that the resulting product will remain fluid at convenient and relatively low dipping temperatures, and improved results are assured.

I use the term "hydrophillic lipin," principally, to describe an ester and ether derivative of a polyhydroxy substance wherein said derivative has a relatively high molecular weight lipophile group with at least one free hydroxy group in the molecule. In general, I prefer to employ hydrophillic lipins having free OH groups which are fatty acid esters of polyhydroxy substances, such as glycerine, polyglycerols, sugars, alcohols derived from sugars, and hydroxy carboxylic acids. In some cases, fatty acid esters of glycols can be used. In all of these hydrophillic lipins, it may be stated that the greater the number of hydroxy groups, other things being equal, the greater is the potency of the hydrophillic lipin as a viscosity reducer, and the less may be used in order to produce a given result.

Somewhat more specifically, I can use satisfactorily in the present invention mono-fatty acid esters of glycerine or polyglycerol and di-fatty acid esters of polyglycerols. Various mixtures of mono-glycerides and mono- and di-polyglycerides may be used, as well as the substantially pure substances, and in many cases, results obtained by using the mixtures are somewhat superior.

As an example of some of the specific compounds which can be used in the present invention, I cite the following: mono-stearic acid ester of glycerol (monostearyl glycerol), mono-palmitic acid ester of glycerol, monocetyl ether of glycerol, monolauryl triglycerol, monolauryl glycerol, monomyristyl diethylene glycol, monomelissyl diethylene glycol, monopalmityl glycerol, mono-oleyl diethylene glycol, mono-oleyl diglycerol, mono-olyel glycerol, diethylene glycol mono-stearate, 1,6-dilauryl diglycerol, and their equivalents. As a further example, I can use alkyl and acyl derivatives of sugars such as dextrose, sucrose, and derivatives of mannitol, sorbitol, polyglycerols, and similar hydroxy substances wherein the derivative in the form of either an ester or ether has at least one free hydroxy group.

It is at once apparent that the hydrophillic lipins which I employ in the present invention have two groups, one a lipophile group having an affinity for oils and fats, and the other a hydrophile group composed essentially of one or more free hydroxy radicals. As a source of the lipophile group, I may use substantially any of the usual fatty acids or aliphatic alcohols, or, where the preferred mixture of esters is to be produced, I can employ the fatty acids of corn oil, cottonseed oil, lard, coconut oil, cocoa butter, and similar natural oils and fats, or hydrogenated or partially hydrogenated oils and fats of the same general character. As a source of the hydrophile group, I use either glycerine, polyglycerols, polyglycols, glycols, sugars, alcohols derived from sugars, and hydroxy carboxylic acids. In view of the fact that the products of the present invention are utilized for edible purposes, I prefer generally that the lipophile group should be attached to the polyhydroxy compounds in the form of an ester linkage, although, where the case warrants, a derivative having an ether linkage may be used to perform a similar function. In general also, I prefer to use esters of glycerine and polyglycerols, rather than glycols.

Of the substances described, the most advantageous are the fatty acid esters of polyglyerols. In general, of this group, a mixture of esters of various fatty acids and various polyglycerols seems to produce the best results. These materials will be identified more accurately hereinafter.

An example of the preparation of a suitable mixture of polyglycerides with free hydroxy groups is as follows: I first polymerize glycerine by incorporating with it about 1% of sodium hydroxide as a catalyst, and heat the mixture continuously, in a non-oxidizing atmosphere, at about 250 to 275° C. for a period of from four to five hours. To 64 parts of the polyglycerol so prepared, I add 54 parts of partially hydrogenated cottonseed oil having a melting point of about 102° C. and .05 parts of caustic soda. This mixture is heated in the absence of air to about 260° C. and kept at this temperature with constant stirring for approximately three hours. The unreacted polyglycerol is then drawn off and the product washed or otherwise purified. Approximately 2% of this mixture, on the basis of the fat used, when added to a candy enrobing mixture containing cocoa powder, sugar and fat, will reduce the viscosity sufficiently to accomplish the advantages of the present invention. Other oils and fats, when similarly treated, also give polyglyceride mixtures, useful for the purposes of my invention. When other hydrophillic lipins are used, for example, mono-olein, a larger proportion is required to produce the same results. The proportion given is illustrative. The invention is not limited to the use of any particular amounts of the substances.

As an example of the action of the mixed polyglyceride composition described in the preceding paragraph, I shall consider the case of a chocolate-enrobing mixture consisting of 148 parts of powdered sugar, 52 parts of cocoa powder, and 100 parts of cocoa butter. Such a mixture has a viscosity at 43° C. of such a nature that 100 c. c. thereof will run by gravity through a certain orifice in 78 to 80 seconds. If ½% of the above polyglyceride composition, on the basis of the cocoa butter, is added to this chocolate mix, and thoroughly dispersed therethrough, the viscosity will be so reduced that the time required will be 65½ seconds. Similarly, 1% reduces the time to 53 seconds, and 2% to 43 seconds. The use of larger quantities of this particular composition, for example 4%, appears to have no further improvement on the reduction of the viscosity. For purposes of comparison, it may be stated that if 5% of mono-olein is introduced in this chocolate mix, the time of flow will be reduced to 47 seconds.

Another example of a highly active interface modifier, extremely useful for the purposes of my invention, and of a method for its preparation, is as follows:

I prepare a mixture of polyglycerols by dissolving two pounds of sodium hydroxide in 200 pounds of glycerol (U. S. Pharmacopeia grade), and heating the mixture continuously in a non-oxidizing atmosphere, with stirring, at about 250° to 275° C. for a period of from four to five hours. To 150 pounds of this polyglycerol preparation, I add 150 pounds of commercial oleic acid of good color and odor, and heat at 220° C., with continuous stirring, in a non-oxidizing atmosphere (affording the water of reaction ample opportunity to escape), for approximately two hours, until the free fatty acid content is approximately ½ of 1%, computed as oleic acid. I wash this mixture successively three times by dispersing it homogeneously in hot water and salting out with sodium chloride. Finally I dry the salted out material. I now heat 90 pounds of this dried material with 56 pounds of similar oleic acid, with constant stirring, in a non-oxidizing atmosphere (preferably by bubbling $CO_2$ through the mixture) for about three hours at approximately 240° C., until the free fatty acid content of the mixture falls to ½ of 1%, more or less. This product, cooled in a non-oxidizing atmosphere, is a mobile liquid comprising a mixture of fatty acid esters of polyglycerols with free hydroxy groups, with very marked interfacial activity of the kind discussed at great length herein. Other fatty acids, such as stearic, myristic, palmitic, lauric, etc., may be similarly treated.

For a more detailed description of other hydrophillic lipins employed in the present invention, those skilled in the art are referred to my co-pending application, Serial No. 431,964, filed February 27, 1930. For a further description of polyglycerides in the form of mixtures which can be used very satisfactorily in the present invention, those skilled in the art are referred to my co-pending application, Serial No. 697,533, filed November 10, 1933.

While the invention has been described with particular regard to viscosity reduction, it is to be understood that the advantages are by no means limited to a mere reduction in viscosity, but that many other improvements are noted.

It should be borne in mind also that while confections of the character noted are generally considered of a relatively simple character due to their common use, from a physical chemical standpoint a very complex system is involved, in which there are interface contacts between the several ingredients employed. My conception is that the materials which I employ function as interface modifiers and that they function to modify the interface characteristics of the particular type of interface present in the confections described. In other words, many so-called interface modifiers of commerce are absolutely without effect in improving the characteristics of enrobing chocolate mixes, for example. As a matter of fact, some interface modifiers not only fail to improve the product, but actually increase viscosity and produce other undesirable results.

The property of the materials of my invention of reducing the viscosity of confections in which a comminuted solid, such as sugar and/or cocoa, is dispersed in a fat may be taken advantage of in various ways. For example, the materials may be used to reduce the viscosity of a given mixture to facilitate an enrobing operation. The materials may also be employed for economizing by reducing the proportion of fat required where the normal viscosity of a mixture would be suitable for a given purpose. In other words, assuming that a given viscosity is present, other things being equal, smaller proportions of the fat ingredient may be employed when the materials of my invention are used and the same viscosity maintained.

In the practical application of the invention, the improvements effected by the introduction of my interface modifiers manifest themselves in various forms to those skilled in the art, specifically confectionery arts. The improvements effected make possible lower enrobing temperatures; they make possible longer cooling periods, thereby permitting longer time in tunnels; they permit a greater range of working temperatures on the enrobing machine; tempering is more uniform and gradual; in the cooking of toffees, by virtue of the fact that a far superior and much more stable emulsion is obtained, the cooking is more flexible and considerable more abuse and variation than heretofore are tolerated without detrimental effects on the ultimate product; the tendency to "blooming" is considerably diminished and delayed. In many instances, additional desired characteristics inure to the product concerned by virtue of a diminished fat content.

Throughout the specification, I have employed the term "lipophile" to designate organic radicals with fatty characteristics. In general, such radicals consist primarily of carbon and hydrogen although they may include ether and/or ester linkages. I have employed this term "lipophile" to denote that the radical so designated has a distinct affinity for oils, fats, waxes and other fatty materials, and imparts a tendency to the molecule of which it is a part, to be wetted by fatty materials.

I have employed the term "hydrophile" throughout this specification primarily to denote properties antithetical to the "lipophile." In counter-distinction to the "lipophile" radicals, the "hydrophile" radicals consist primarily of oxygen and of oxygen with hydrogen and the "hydrophile" characteristics are imparted primarily by hydroxy groups attached to carbon. The hydrophillic character manifests itself by an affinity for water and aqueous media, and the hydrophile radical imparts to the molecule of which it is a member, a tendency to be wetted by water and aqueous media. The degree or extent of the hydrophillic character is dependent upon the number of hydroxy groups and their location in the molecule, and is also influenced by the number and character of lipophile groups with which they are associated in the molecule.

Those skilled in the art will understand from what has been said hereinabove that in those instances in which the hydrophile function is performed entirely by a single hydroxy group, unaided by other hydroxy groups or by a sufficient number of other oxygen containing groups or by other hydrophile groups of whatever character, the hydrophile function is comparatively weak and the interface modifying powers of the molecule as a whole are not particularly pronounced, though they may be present in moderate degree. Examples of such interface modifiers which come within the scope of my invention, but whose interface modifying powers are of much lesser magnitude than those already discussed hereinabove, are aliphatic alcohols such as octadecyl alcohol, cetyl alcohol, lauryl alcohol, octyl alcohol, hexyl alcohol, oleic acid, myristic acid, lauric acid, diglycerides such as diolein, dilaurin, stearo-olein and the like. It will be seen that the members of this list of substances and equivalents thereof possess a hydroxy group, and by virtue of the presence of this free hydroxy group, they show interface modifying powers, but their interface modifying powers are not particularly pronounced, though they are measurable.

Throughout this specification, I have employed the prefix "poly", as in the case of the words "polyhydroxy", "polyhydric", and others, to designate more than one.

A very convenient procedure for incorporating the interface modifiers of my invention, is to dissolve them in the fat content of the confection in which they are to be used. The usual fatty materials employed are cocoa butter, so-called pressed butters, coconut oil stearine, palm kernel oil stearine, dairy butter, hydrogenated oils and other oils, fats and fatty materials.

What I claim as new and desire to protect by Letters Patent of the United States is:

1. A confection composition of matter comprising a comminuted material dispersed in a fatty material and including a proportion of a hydrophillic lipin having lipophile and hydrophile properties, said hydrophillic lipin being an aliphatic derivative of a polyhydroxy substance, said derivative having at least one free hydroxy group derived from the polyhydroxy substance, the aliphatic radical having at least six carbon atoms.

2. A confection composition of matter comprising a comminuted material dispersed in a fatty material and including a higher fatty acid ester of a polyhydroxy substance said ester having at least one free hydroxy group derived from the polyhydroxy substance.

3. A confection composition of matter comprising a comminuted material dispersed in a fatty material and including a proportion of a higher fatty acid ester of a polyhydric alcohol said ester having at least one free alcoholic hydroxy group derived from the polyhydric alcohol.

4. A confection composition of matter comprising a comminuted material dispersed in a fatty material and including a higher fatty acid ester of polyglycerol said ester having at least one free hydroxy group derived from the polyglycerol.

5. A confection composition of the character described, comprising a comminuted material of the class consisting of sugar, cocoa powder, and milk powder, dispersed in a fatty material and having included therein a proportion of a higher fatty acid ester of a polyhydroxy substance said ester having at least one free hydroxy group derived from the polyhydroxy substance.

6. A confection composition of matter comprising a substantially dry mixture of a comminuted material, including a sugar, dispersed in a fatty material and having included therein a proportion of a higher fatty acid ester of a polyhydroxy substance said ester having at least one free hydroxy group derived from the polyhydroxy substance.

7. The method of improving confection compositions of matter of a class consisting of chocolate, chocolate-like coatings for confections, including candy creams, cookies and ice-cream, chocolate confections, icings, fillings, fudges, butter creams, caramels and toffees, which comprises dispersing in said materials a proportion of a higher fatty acid ester of a polyhydroxy substance, said ester having at least one free hydroxy group derived from the polyhydroxy substance.

8. The method of producing a confection of a class wherein a comminuted sugar material is dispersed in a fat which comprises dispersing in said fat a proportion of a higher fatty acid ester of a polyhydroxy substance, said ester having at least one free hydroxy group derived from the polyhydroxy substance, and combining together other materials of the confection including the sugar and fat to produce the final product.

9. A confection composition including cocoa powder, fatty material and an improving agent in the form of an aliphatic derivative of polyhydroxy substance, said derivative having at least one free hydroxy group derived from the polyhydroxy substance, said confection composition having a viscosity less than the viscosity of the same composition without the improving agent, the aliphatic radical having at least six carbon atoms.

10. A confection composition including cocoa powder, fatty material and an improving agent in the form of a higher fatty acid ester of a polyhydroxy substance, said ester having at least one free hydroxy group derived from the polyhydroxy substance, said confection composition having a viscosity less than the viscosity of the same composition without the improving agent.

11. A confection composition including cocoa powder, fatty material and an improving agent in the form of a higher fatty acid ester of a polyhydric alcohol, said ester having at least one free alcoholic hydroxy group derived from the polyhydric alcohol, and said confection composition having a viscosity less than the viscosity of the same composition without the improving agent.

12. A confection composition including cocoa powder, fatty material and an improving agent in the form of a higher fatty acid ester of polyglycerol, said ester having at least one free hydroxy group derived from the polyglycerol, and said confection composition having a viscosity less than the viscosity of the same composition without the improving agent.

13. A confection composition of the character described, comprising a comminuted material of the class consisting of sugars, cocoa powder and milk powder, dispersed in fatty material and an improving agent in the form of a higher fatty acid ester of a polyhydroxy substance, said ester having a least one free hydroxy group derived from the polyhydroxy substance.

14. A confection composition of the character described, comprising a comminuted material of the class consisting of sugars, cocoa powder and milk powder, dispersed in fatty material and an improving agent in the form of a higher fatty acid ester of polyglycerol, said ester having at least one free hydroxy group derived from the polyglycerol.

15. A confection composition of matter comprising comminuted material dispersed in a fatty material and including a hydrophillic lipin mixture comprising essentially a mixture of glycerides with at least one free hydroxy group and polyglycerides with at least one free hydroxy group.

16. A confection composition of matter comprising comminuted material dispersed in a fatty material and including approximately 2% of a hydrophillic lipin mixture comprising essentially a mixture of glycerides with at least one free hydroxy group and polyglycerides with at least one free hydroxy group.

17. The method of producing an improved confection composition of a type having comminuted material dispersed in a fatty material, said method comprising re-esterifying an oleaginous material of the class consisting of oils, fats and waxes with polyglycerol, and incorporating the resulting mixture in said confection composition.

18. A confection composition comprising a comminuted material dispersed in a fat and a proportion of a non-nitrogenous hydrophillic lipin having lipophile and hydrophile properties, the lipophile properties being imparted to the molecule as a whole by a carbon chain radical with at least six carbon atoms, and the hydrophile property being imparted to the molecule primarily by hydroxy groups, at least one being present.

BENJAMIN R. HARRIS.